(12) United States Patent
Zhu

(10) Patent No.: US 12,337,662 B1
(45) Date of Patent: Jun. 24, 2025

(54) VEHICLE-MOUNTED FRAGRANCE HOLDER

(71) Applicant: Sheng Zhu, Shenzhen (CN)

(72) Inventor: Sheng Zhu, Shenzhen (CN)

( * ) Notice: Subject to any disclaimer, the term of this patent is extended or adjusted under 35 U.S.C. 154(b) by 0 days.

(21) Appl. No.: 19/058,040

(22) Filed: Feb. 20, 2025

(30) Foreign Application Priority Data

Jan. 17, 2025 (CN) .......................... 202520114950.0

(51) Int. Cl.
*A61L 9/00* (2006.01)
*A24F 25/00* (2006.01)
*B60H 3/00* (2006.01)

(52) U.S. Cl.
CPC .................... *B60H 3/0007* (2013.01)

(58) Field of Classification Search
CPC ... A61L 2/23; A61L 9/04; A61L 9/048; A61L 9/12; A61L 2209/13; A61L 2209/134; B60H 3/007; B60H 3/0028
USPC ............... 422/5, 123, 306; 261/104; 239/53; 392/394
See application file for complete search history.

(56) References Cited

U.S. PATENT DOCUMENTS 8,412,030 B2 * 4/2013 Beland .................... A61L 9/037
392/394

* cited by examiner

*Primary Examiner* — Monzer R Chorbaji
(74) *Attorney, Agent, or Firm* — SBPC & BMLaw

(57) ABSTRACT

Provided is a vehicle-mounted fragrance holder comprising a connecting device, a holder body, a movable piece, a first elastic element, a first articulated piece, a second elastic element, and a second articulated piece. The holder body is arranged on the connecting device for fixation within the vehicle, and the connecting device. The holder body is used for accommodating a fragrance and provided with a louver. One end of the second articulated piece is a first abutting end for abutting against the louver to push it open when the second articulated piece rotates forward, while the other end is a second abutting end. The second articulated piece is articulated within the holder body, and the first articulated piece is articulated within the holder body and located between the movable piece and the second abutting end of the second articulated piece. The movable piece is movably mounted on the holder body.

14 Claims, 8 Drawing Sheets

VEHICLE-MOUNTED FRAGRANCE HOLDER

CROSS-REFERENCE TO RELATED APPLICATION

The present disclosure claims priority to Chinese Patent Application No. 202520114950.0 with a tile of "VEHICLE-MOUNTED FRAGRANCE HOLDER" filed on Jan. 17, 2025, the entire contents of which are incorporated by reference herein.

FIELD

The present disclosure relates to a vehicle-mounted fragrance holder.

BACKGROUND

A vehicle-mounted fragrance holder is commonly used for placing fragrances, so as to accommodate them in a vehicle and spread aroma slowly in the vehicle, thereby improving the odor in the vehicle, relieve the driving pressure, and enhance the atmosphere in the vehicle.

However, the existing vehicle-mounted fragrance holders are directly placed in vehicles for use. In situations such as braking, the vehicle-mounted fragrance holders are prone to displacement in the vehicles. Moreover, the existing vehicle-mounted fragrance holders comprise both a holder body for accommodating fragrances and an outer cover. During use, it is necessary to rotate the outer cover on the holder body manually and continuously to unscrew the outer cover, thereby realizing the opening the vehicle-mounted fragrance holders and spreading the aroma of the fragrances out of the holder body. However, since the outer cover is separated from the holder body after it is unscrewed, the outer cover is liable to loss during use, and the loss of the part is apt to affect the subsequent storage of the fragrances.

SUMMARY

To overcome the deficiencies of the prior art, it is an objective of the present disclosure to provide a vehicle-mounted fragrance holder that can be fixed in a vehicle through a connecting device, which can prevent the vehicle-mounted fragrance holder from displacement during use. Moreover, by pushing the movable piece, the louver can be opened to realize the opening of the vehicle-mounted fragrance holder, which can avoid the loss of parts as caused by the opening of the vehicle-mounted fragrance holder.

The objective of the present disclosure is achieved by adopting the following technical solution.

A vehicle-mounted fragrance holder comprises a connecting device, a holder body, a movable piece, a first elastic element, a first articulated piece, a second elastic element, and a second articulated piece; the connecting device is used for fixation in a vehicle, and the holder body is arranged on the connecting device; the holder body is used for accommodating fragrances and provided with a louver; one end of the second articulated piece is formed as a first abutting end, and the other end is formed as a second abutting end; the second articulated piece is articulated in the holder body, and the first abutting end of the second articulated piece is used for abutting against the louver to push open the louver when the second articulated piece rotates forward; the first articulated piece is articulated within the holder body and located between the movable piece and the second abutting end of the second articulated piece; the movable piece is movably mounted on the holder body, and the first elastic element is positioned between the movable piece and the holder body, pressed against both, and used for providing an elastic force that drives the movable piece to move towards the outside of the holder body; the movable piece is used for pushing the first articulated piece when moving towards the interior of the holder body, so as to propel the second articulated piece to rotate forward through the first articulated piece; the second elastic element is arranged between the holder body and the louver and used for providing an elastic force that drives the louver to close.

The connecting device comprises a first supporting member, a second supporting member, and a third elastic element; the first supporting member comprises a first abutting portion, the second supporting member comprises a second abutting portion, and the first abutting portion and the second abutting portion are used for abutting against the interior of the vehicle, respectively; the first supporting member and the second supporting member are in sliding fit, and the third elastic element is positioned between the first supporting member and the second supporting member, pressed against both, and used for providing an elastic force that drives the first abutting portion and the second abutting portion to move away from each other; the holder body is mounted on the second supporting member.

The second supporting member comprises a supporting seat body, the second abutting portion is arranged on the supporting seat body, and the holder body is mounted on the supporting seat body through a universal joint.

The third elastic element is a third spring.

The first elastic element is a first spring that is positioned between the movable piece and the holder body and pressed against both, and the second elastic element is a second spring that is connected between the holder body and the louver.

The louver comprises a plurality of slats, which are rotatably mounted on the holder body, respectively; the louver further comprises a connecting rod, and said plurality of slats are articulated on the connecting rod, respectively.

Convex columns that correspond to said plurality of slats one by one are arranged on the connecting rod, a connecting wing is arranged on each slat, and a mounting hole is arranged on the connecting wing; the mounting hole of the connecting wing of the slat is configured for insertion of a corresponding convex column.

The first abutting end of the second articulated piece is used for abutting against one of the slats of the louver; the second elastic element is arranged between the holder body and the connecting rod of the louver.

A fitting portion is arranged on the movable piece, and the holder body is provided with a locking portion; when the movable piece is pressed to move towards the interior of the holder body to a position where the fitting portion corresponds to the locking portion, the locking portion is used for locking the fitting portion, so that the movable piece pushes the second articulated piece through the first articulated piece to keep the louver open; when the locking portion locks the fitting portion, the fitting portion can be unlocked from the locking portion by pressing the movable piece towards the interior of the holder body, so that when a pressing force on the movable piece is removed, the movable piece moves towards the outside of the holder body under the action of the first elastic element, and the louver returns to the closed state under the action of the elastic force of the second elastic element.

The holder body comprises a magnetic component, on which a through-hole is arranged; the movable piece is inserted into the through-hole; distal from the first articulated piece, an end of the through-hole is formed as an outlet end; the outlet end is used for allowing an end of the movable piece to extend through, which end is distal from the first articulated piece; the holder body further comprises a main holder, on which the magnetic component is arranged on; the main holder is used for accommodating fragrances and provided with the louver; the first articulated piece and the second articulated piece are articulated within the main holder, respectively.

Compared with the prior art, the present disclosure has beneficial effects as follows.

A vehicle-mounted fragrance holder provided by the present disclosure adopts a combination of a connecting device, a holder body, a movable piece, a first elastic element, a first articulated piece, a second elastic element, and a second articulated piece, and can be fixed in a vehicle through the connecting device, which can prevent the vehicle-mounted fragrance holder from displacement during use. Moreover, by pushing the movable piece, the louver can be driven to open, so as to realize the opening of the vehicle-mounted fragrance holder, which makes the opening operation simple and convenient. Furthermore, the opening of the vehicle-mounted fragrance holder can be realized without rotating an outer cover, so as to avoid loss of the part as caused by the opening of the vehicle-mounted fragrance holder; in addition, by using a magnetic component on the holder body, objects such as a mobile phone can be magnetically attached to the magnetic component, so as to drive the louver to open by continuously pushing the movable piece with the objects such as a mobile phone, while performing the function of fixing the objects such as a mobile phone, thereby further improving the convenience of the opening operation and facilitating use.

Wherein, 10. holder body; 11. external convex portion; 12. magnetic component; 13. through-hole; 14. main holder; 20. movable piece; 30. first articulated piece; 31. first acting end; 32. second acting end; 40. second articulated piece; 41. first abutting end; 42. second abutting end; 50. louver; 51. slat; 52. connecting rod; 53. convex column; 54. connecting wing; 55. mounting hole; 60. first supporting member; 61. first abutting portion; 62. limiting slot; 63. first mounting slot; 64. first guiding portion; 65. second guiding portion; 70. second supporting member; 71. second abutting portion; 72. mounting portion; 73. second mounting slot; 74. first guiding slot; 75. first lower limiting portion; 76. first upper limiting portion; 77. second guiding slot; 78. second lower limiting portion; 79. second upper limiting portion; 80. supporting seat body; 81. first side plate; 82. second side plate; 83. universal joint; 84. clamping slot; 90. connecting device; 91. third elastic element; 93. fitting portion; 94. locking portion.

DETAILED DESCRIPTIO

In combination with the drawings and specific manners of implementation, the present disclosure will be further described as below. It should be noted that, without conflicting, the embodiments or technical features described below can be combined arbitrarily to form new embodiments.

Figure 1:
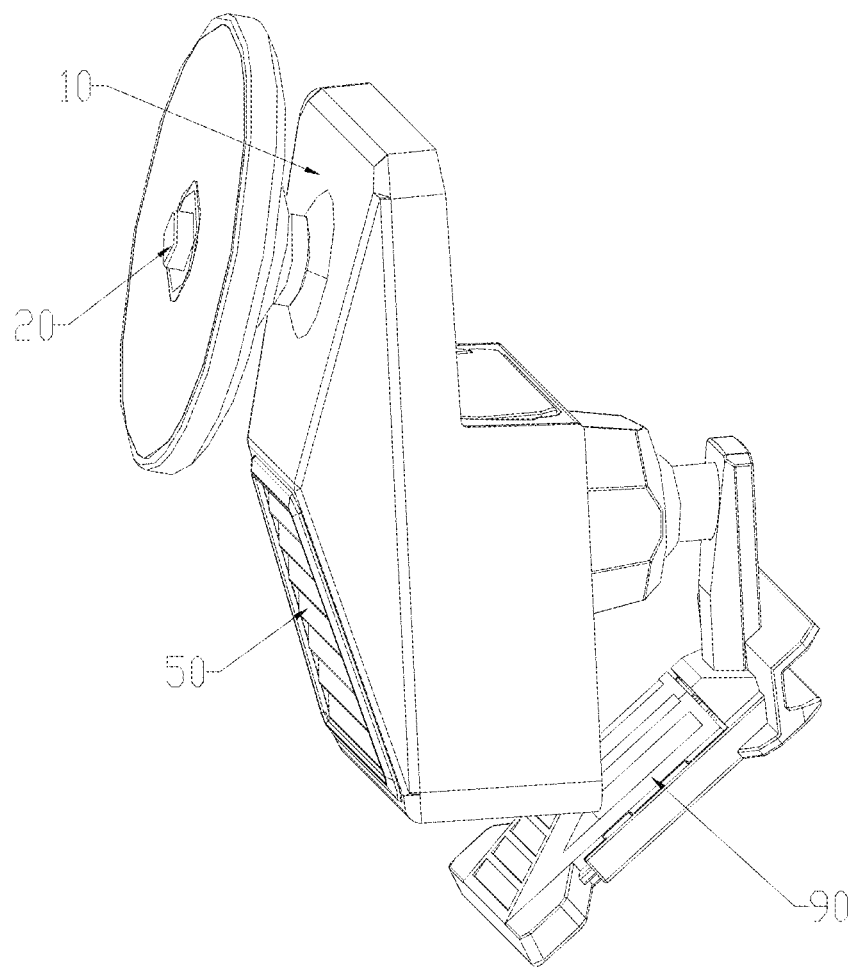
FIG. 1 is a structure diagram of the vehicle-mounted fragrance holder in the present disclosure.
Figure 2:
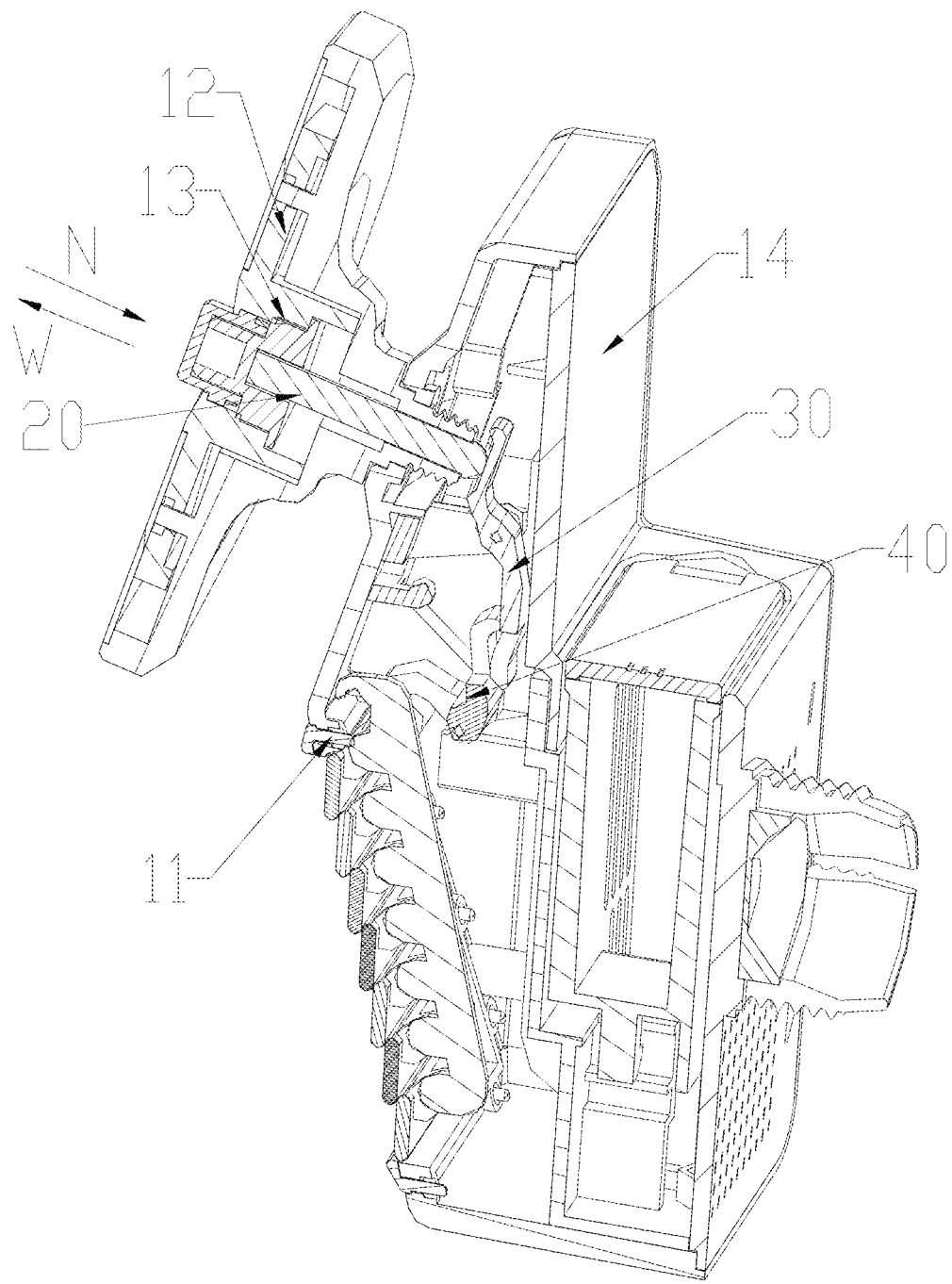
FIG. 2 is a sectional view of the vehicle-mounted fragrance holder in the present disclosure.
Figure 3:
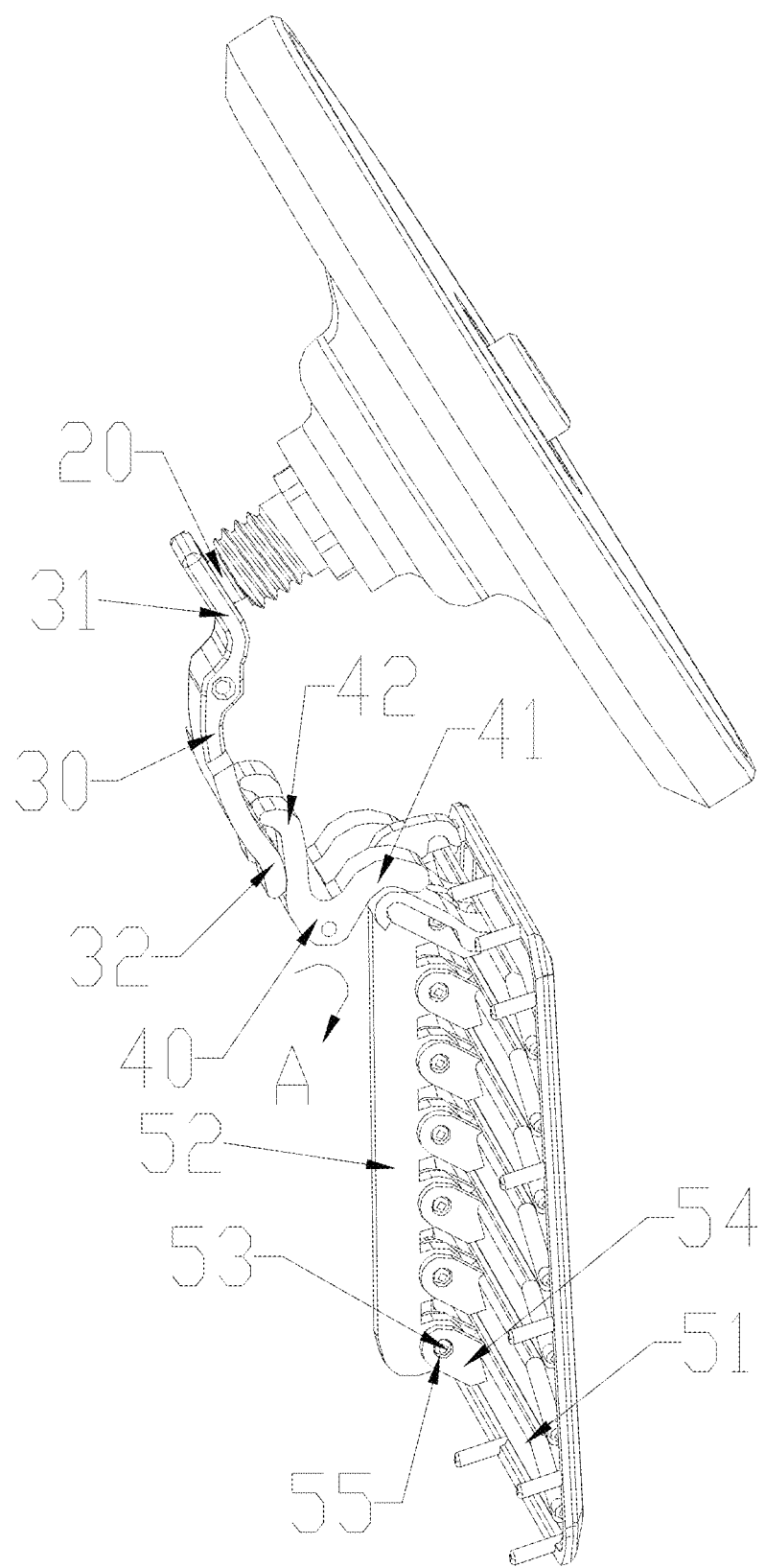
FIG. 3 is a fitting diagram of the movable piece, the first articulated piece, the second articulated piece, and the louver.
Figure 4:
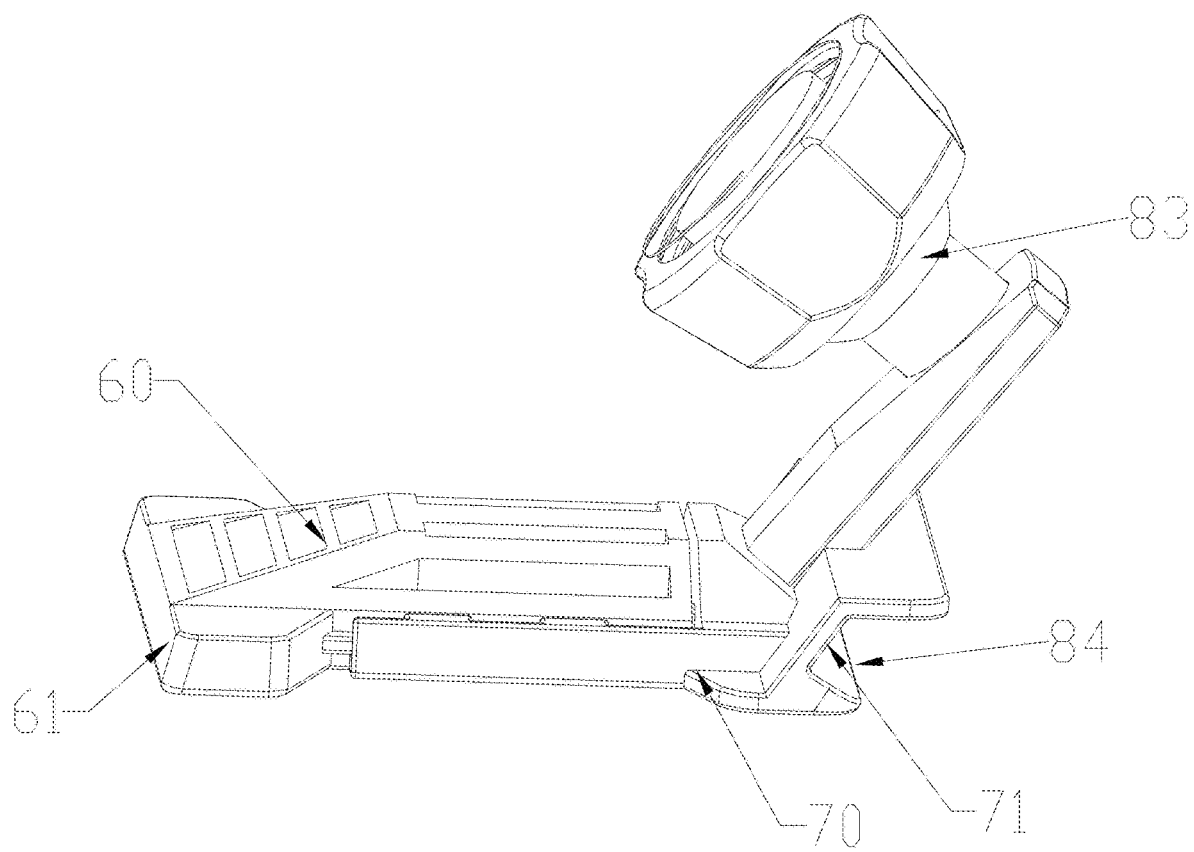
FIG. 4 is a structure diagram of the connection device of the vehicle-mounted fragrance holder in the present disclosure.
Figure 5:
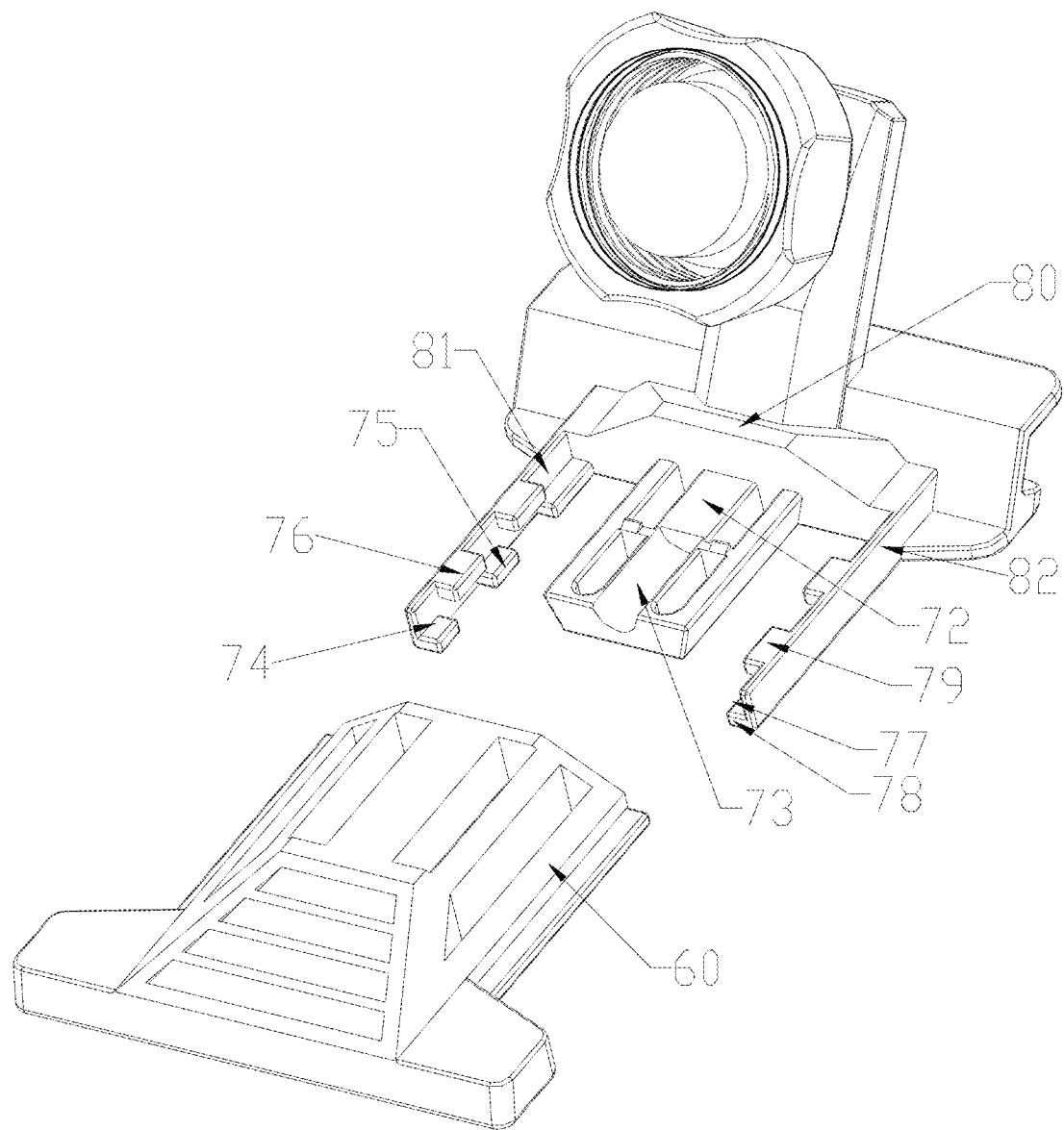
FIG. 5 is an exploded view of the connection device of the vehicle-mounted fragrance holder in the present disclosure.
Figure 6:
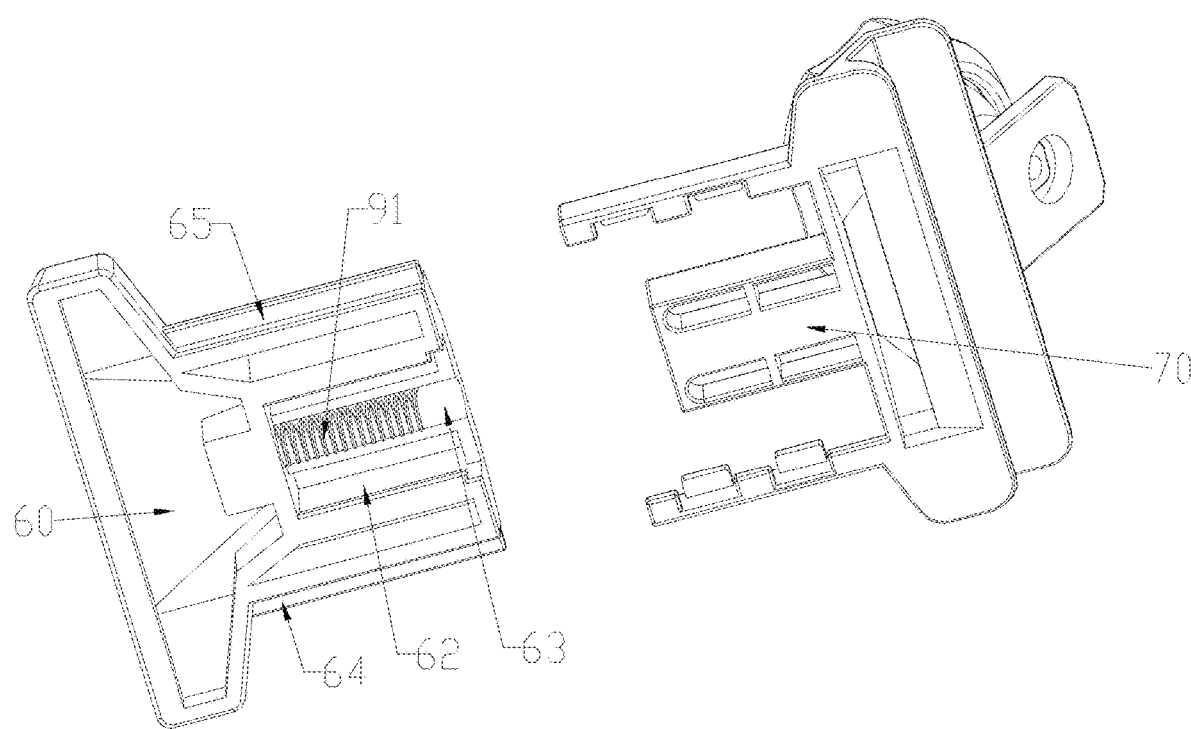
FIG. 6 is a rear and exploded view of the connection device of the vehicle-mounted fragrance holder in the present disclosure.
Figure 7:
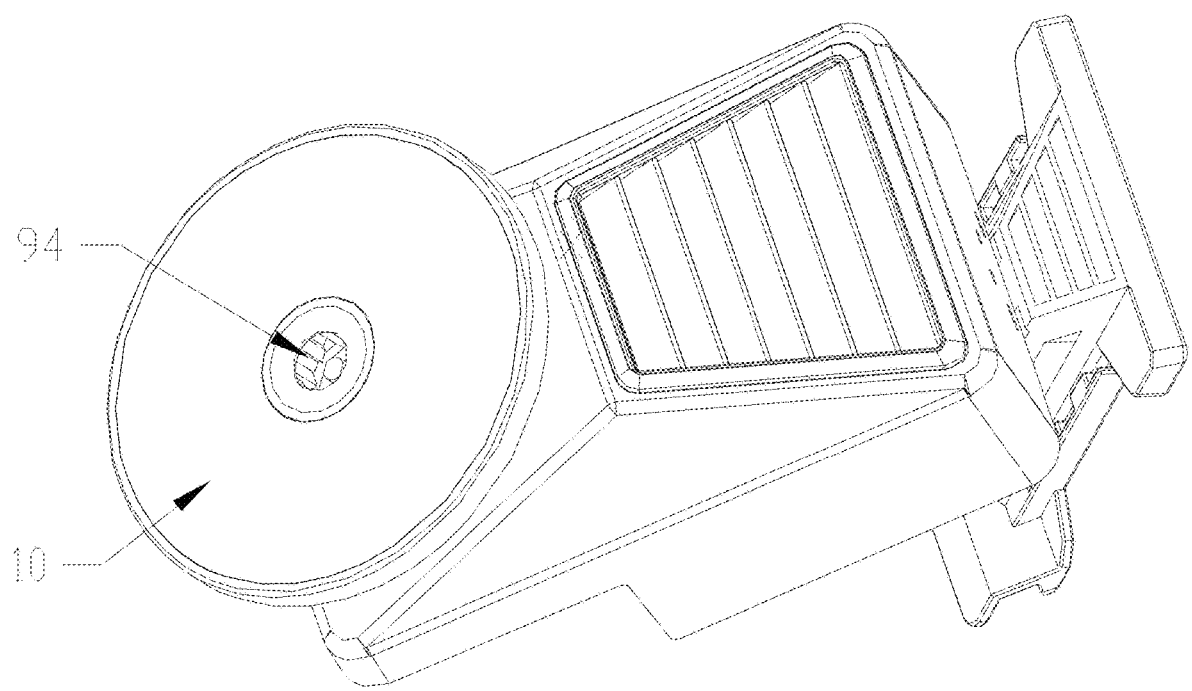
FIG. 7 is a diagram of the locking portion.
Figure 8:
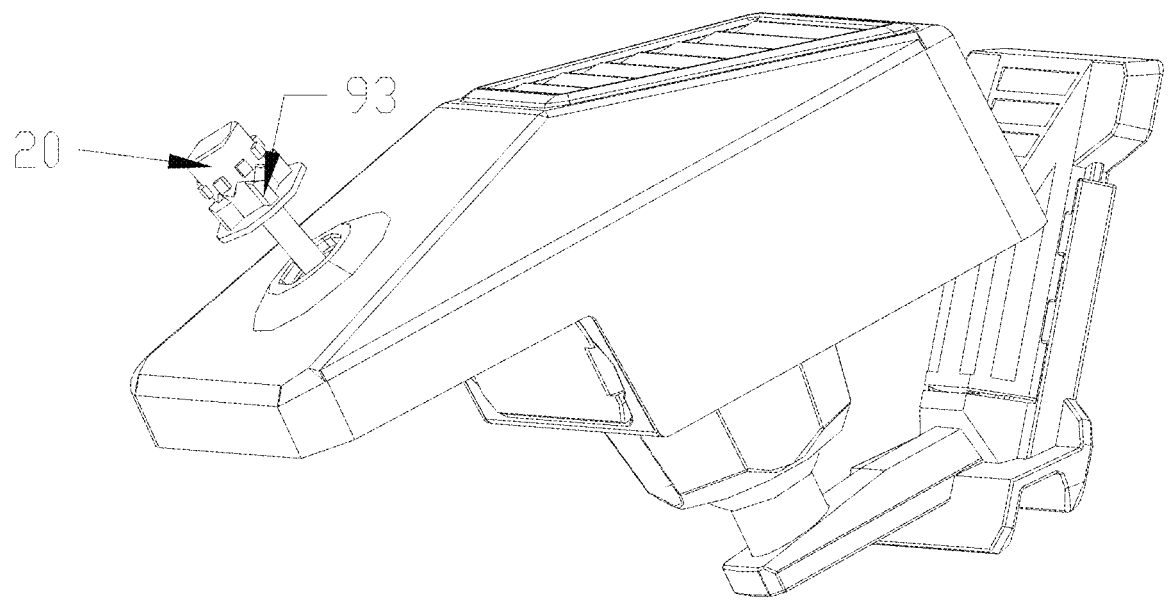
FIG. 8 is a diagram of the fitting portion.

As shown in FIGS. 1-8, a vehicle-mounted fragrance holder comprises a connecting device 90, a holder body 10, a movable piece 20, a first elastic element, a first articulated piece 30, a second elastic element, and a second articulated piece 40; the connecting device 90 is used for fixation in a vehicle, and the holder body 10 is arranged on the connecting device 90; the holder body 10 is used for accommodating fragrances and provided with a louver 50; one end of the second articulated piece 40 is formed as a first abutting end 41, and the other end is formed as a second abutting end 42; the second articulated piece 40 is articulated in the holder body 10, and the first abutting end 41 of the second articulated piece 40 is used for abutting against the louver 50 to push open the louver 50 when the second articulated piece 40 rotates in a forward direction A; the first articulated piece 30 is articulated in the holder body 10 and located between the movable piece 20 and the second abutting end 42 of the second articulated piece 40; the movable piece 20 is movably mounted on the holder body 10, and the first elastic element is positioned between the movable piece 20 and the holder body 10, pressed against both, and used for providing an elastic force that drives the movable piece 20 to move towards the outside of the holder body 10 (i.e., in a direction W); the movable piece 20 is used for pushing the first articulated piece 30 when moving towards the interior of the holder body 10 (i.e., in a direction N), so as to propel the second articulated piece 40 to rotate forward through the first articulated piece 30; the second elastic element is arranged between the holder body 10 and the louver 50, and is used for providing an elastic force that drives the louver 50 to close.

During use, the vehicle-mounted fragrance holder can be fixed in a vehicle through the connecting device 90, which can prevent the vehicle-mounted fragrance holder from displacement during use. Then, the movable piece 20 can be pressed by a person or an external object to move towards the interior of the holder body 10, the first articulated piece 30 can be pushed through the movable piece 20, and the second articulated piece 40 can be pushed forward through the first articulated piece 30 to rotate forward, so that the second articulated piece 40 pushes open the louver 50, thereby realizing the opening of the vehicle-mounted fragrance holder and spreading aroma out of the opened louver 50. If the pressing force on the movable piece 20 is removed, then the movable piece 20 moves towards the outside of the holder body 10 under the action of the elastic force of the first elastic element, the louver 50 returns to the closed state under the action of the elastic force of the second elastic element, the second articulated piece 40 is pushed through the louver 50 to rotate to the initial position, and the first articulated piece 30 is pushed through the second articulated piece 40 to rotate to the initial position. As such, a vehicle-mounted fragrance holder provided by the present disclosure adopts a combination of a connecting device 90, a holder body 10, a movable piece 20, a first elastic element, a first articulated piece 30, a second elastic element, and a second articulated piece 40, and can be fixed in a vehicle through the connecting device 90, which can prevent the vehicle-mounted fragrance holder from displacement during use. Moreover, by pushing the movable piece 20, the louver 50 can be driven to open, so as to realize the opening of the vehicle-mounted fragrance holder, which makes the opening operation simple and convenient. Furthermore, the opening of the vehicle-mounted fragrance holder can be realized without rotating an outer cover, so as to avoid loss of the part as caused by the opening of the vehicle-mounted fragrance holder.

One end of the first articulated piece 30 is formed as a first acting end 31, and the other end is formed as a second acting end 32; the first acting end 31 of the first articulated piece 30 is used for abutting against the movable piece 20, and the second acting end 32 of the first articulated piece 30 is used for abutting against the second abutting end 42 of the second articulated piece 40. The employment of the above structure facilitates the cooperation between the first articulated piece 30 and the second articulated piece 40, so that the second articulated piece 40 can be pushed through the first articulated piece 30 in a convenient manner when the movable piece 20 is pushed.

The first elastic element is a first spring that is positioned between the movable piece 20 and the holder body 10 and pressed against both. The second elastic element is a second spring that is connected between the holder body 10 and the louver 50.

Of course, in addition to the above, the first elastic element and the second elastic element can also use elastic elements such as elastic strips, as long as they can provide corresponding elastic forces.

The louver 50 comprises a plurality of slats 51, which are rotatably mounted on the holder body 10, respectively; the louver 50 further comprises a connecting rod 52, and said plurality of slats 51 are articulated on the connecting rod 52, respectively. The first abutting end 41 of the second articulated piece 40 is used for abutting against one of the slats 51 of the louver 50. During use, when rotating forward, the second articulated piece 40 can push the slat 51 against which it abuts to rotate, and drive the connecting rod 52 to move through the slat 51, thereby driving the other slats 51 to rotate, and further opening the louver 50.

The slat 51 has a lower end that is articulated on holder body 10. Specifically, rotating shafts are arranged on both sides of the lower end of the slat 51, and the slat 51 is rotatably mounted on the holder body 10 through the rotating shafts on both sides.

Convex columns 53 that correspond to said plurality of slats 51 one by one is arranged on the connecting rod 52, and a connecting wing 54 is arranged on each slat 51, and a mounting hole 55 is arranged on the connecting wing 54; the mounting hole 55 of the connecting wing 54 of the slat 51 is configured for insertion of a corresponding convex column 53. The employment of the above structure can facilitate assembly, while it can be realized that said plurality of slats 51 are articulated on the connecting rod 52.

The second elastic element is arranged between the holder body 10 and the connecting rod 52 of the louver 50, for the convenient of connection. When the pushing force on the movable piece 20 is removed, the connecting rod 52 of the louver 50 is reset under the action of the elastic force of the second elastic element, and drives each slat 51 to return to the closed state through the connecting rod 52.

An external convex portion 11 for abutment of the connecting rod 52 is arranged on the holder body 10.

A fitting portion 93 is arranged on the movable piece 20, and a locking portion 94 is arranged on the holder body 10; when the movable piece 20 is pressed to move towards the interior of the holder body 10 to a position where the fitting portion 93 corresponds to the locking portion 94, the locking portion 94 is used for locking the fitting portion 93, so that the movable piece 20 pushes the second articulated piece 40 through the first articulated piece 30 to keep the louver 50 open; when the locking portion 94 locks the fitting portion 93, the fitting portion 93 can be unlocked from the locking portion 94 by pressing the movable piece 20 towards the interior of the holder body 10, so that when the pressing force on the movable piece 20 is removed, the movable piece 20 moves towards the outside of the holder body 10 under the action of the first elastic element, and the louver 50 returns to the closed state under the action of the elastic force of the second elastic element. During use, when the movable piece 20 is pressed to move towards the interior of the holder body 10 to a position where the fitting portion 93 corresponds to the locking portion 94, the locking portion 94 locks the fitting portion 93, so that the movable piece 29 keeps pushing the first articulated piece 30, and the first articulated piece 30 keeps pushing the second articulated piece 40, thereby keeping the louver 50 open. When the locking portion 94 locks the fitting portion 93, the fitting portion 93 is unlocked from the locking portion 94 by pressing the movable piece 20 to move towards the interior of the holder body 10, so that when the pressing force on the movable piece 20 is removed, the movable piece 29 moves towards the outside of the holder body 10 under the action of the first elastic element, and the louver 50 returns to the closed state under the elastic force of the second elastic element; the second articulated piece 40 is pushed to rotate to the initial position through the louver 50, and the first articulated piece 30 is pushed to rotate to the initial position through the second articulated piece 40, which further facilitates use.

The fitting portion 93 and the locking portion 94 can adopt a locking structure of a press pen or an electromagnetic locking structure, etc., as long as they can play corresponding roles.

The holder body 10 comprises a magnetic component 12, on which a through hole 13 is arranged. The movable piece 20 is inserted into the through hole 13. Moreover, an end of the through hole 13, which end is distal from the first articulated piece 30 is formed as an outlet end. The outlet end is used for allowing an end of the movable piece 20 to extend through, which end is distal from the first articulated piece 30. During use, objects such as a mobile phone can be magnetically attached to the magnetic component 12; the movable piece 20 moves towards the interior of the holder body 10 by continuously pushing the movable piece 20 with the objects such as a mobile phone; the first articulated piece 30 is pushed through the movable piece 20; the second articulated piece 40 is pushed to rotate forward through the first articulated piece 30, so that the second articulated piece 40 pushes open the louver 50, thereby further improving the simplicity of the opening operation and facilitating use; the magnetic attachment of the magnetic component 12 can facilitate placing the objects such as a mobile phone in a fixed manner.

In this embodiment, the locking portion 94 is located on the magnetic component 12.

The holder body 10 further comprises a main holder 14, on which the magnetic component 12 is arranged; the main holder body 14 is used for accommodating fragrances and provided with the louver 50; the first articulated piece 30 and the second articulated piece 40 are respectively articulated in the main holder 14 to facilitate mounting.

In this embodiment, during use, the objects such as a mobile phone can be magnetically attached to the magnetic component 12; as the objects such as a mobile phone pushes the movable piece 20 continuously, the movable piece 20 moves towards the interior of the holder body 10; the first articulated piece 30 is pushed through the movable piece 20; the second articulated piece 40 is pushed to rotate forward through the first articulated piece 30, so that the second articulated piece 40 pushes open the louver 50; by separating the objects such as a mobile phone from the magnetic component 12, the movable piece 20 moves towards the outside of the holder body 10 under the action of the first elastic element, and the louver 50 returns to the closed state under the action of the elastic force of the second elastic element. During use, the movable piece 20 can also be pressed to move towards the interior of the holder body 10 to a position where the fitting portion 93 corresponds to the locking portion 94; the locking portion 94 locks the fitting portion 93, so that the movable piece 29 keeps pushing the first articulated piece 30, and the first articulated piece 30 keeps pushing the second articulated piece 40, thereby keeping the louver 50 open. When the locking portion 94 locks the fitting portion 93, the fitting portion 93 can be unlocked from the locking portion 94 by pressing the movable piece 20 to move towards the interior of the holder body 10, so that when the pressing force on the movable piece 20 is removed, the movable piece 20 moves towards the outside of the holder body 10 under the action of the first elastic element, and the louver 50 returns to the closed state under the action of the elastic force of the second elastic element. Wherein, as the movable piece 20 moves to a position where the fitting portion 93 corresponds to the locking portion 94, the position is deeper inside the holder body 10 than that of the movable piece 20 when the objects such as a mobile phone are magnetically attached to the magnetic portion 12.

The connecting device 90 comprises a first supporting member 60, a second supporting member 70, and a third elastic element 91; the first supporting member 60 comprises a first abutting portion 61, and the second supporting member 70 comprises a second abutting portion 71; the first abutting portion 61 and the second abutting portion 71 are used for abutting against the interior of a vehicle; the first supporting member 60 and the second supporting member 70 are in sliding fit, and the third elastic element 91 is positioned between the first supporting member 60 and the second supporting member 70, pressed against both, and used for providing an elastic force that drives the first abutting portion 61 and the second abutting portion 71 to move away from each other. The holder body 10 is arranged on the second supporting member 70.

In the process of fixation in the vehicle, the first supporting member 60 and/or the second supporting member 70 can be pushed, so that relative movement occurs between the first supporting member 60 and the second supporting member 70 and makes them close to each other; at this moment, the third elastic element 91 is compressed; when it reaches a corresponding portion in the vehicle, the first supporting member 60 and/or the second supporting member 70 are released; under the action of the elastic force of the third elastic element 91, the first supporting member 60 and the second supporting member 70 move relatively far away from each other, so that the first abutting portion 61 of the first supporting member 60 and the second abutting portion 71 of the second supporting member 70 respectively abut against the interior of the vehicle and keep doing so under the action of the elastic force of the third elastic element 91. As such, the reasonable arrangement of the first supporting member 60, the second supporting member 70, and the third elastic element 91 in the connecting device 90 can facilitate the fixation in the vehicle, without the need to continuously rotate a screw until a second fixture is locked, which makes the fixing operation simple, fast, and convenient, and can improve the fixing efficiency; moreover, the structure thereof is simple, and the assembly is easy, which is conducive to reducing the cost.

A limiting slot 62 is arranged on the first supporting member 60, and a mounting portion 72 in sliding fit with the limiting slot 62 is arranged on the second supporting member 70. A first mounting slot 63 in communication with the limiting slot 62 is also arranged on the first supporting member 60, and a second mounting slot 73 is arranged on the mounting portion 72; one end of the third elastic element 91 is pressed against the slot wall of the first mounting slot 63, and the other end is pressed against the slot wall of the second mounting slot 73. By adopting the above structure, the stability in mounting the third elastic element 91 can be improved.

Specifically, the mounting portion 72 is rectangular in shape.

On the second supporting member 70, a first guiding slot 74 that extends in a sliding direction thereof is arranged, and a first guiding portion 64 in sliding fit with the first guiding slot 74 is arranged on the first supporting member 60, so that the smoothness and stability of the relative movement between the first supporting member 60 and the second supporting member 70 can be improved through the cooperation between the first guiding slot 74 and the first guiding portion 64.

A first lower limiting portion 75 and a first upper limiting portion 76 located above the first lower limiting portion 75 are arranged on the second supporting member 70, and the first guiding slot 74 is formed between the first lower limiting portion 75 and the first upper limiting portion 76. The employment of the above structure can facilitate forming the first guiding slot 74.

The first upper limiting portion 76 and the first lower limiting portion 75 can use at least two first guiding blocks that are arranged to be spaced apart, which can reduce the consumption of materials and lower the cost.

On the second supporting member 70, a second guiding slot 77 that extends in a sliding direction thereof is arranged, and a second guiding portion 65 in sliding fit with the second guiding slot 77 is arranged on the first supporting member 60, so that the smoothness and stability of the relative movement between the first supporting member 60 and the second supporting member 70 can be improved through the cooperation between the second guiding slot 77 and the second guiding portion 65.

A second lower limiting portion 78 and a second upper limiting portion 79 located above the second lower limiting portion 78 are arranged on the second supporting member 70, and the second guiding slot 77 is formed between the second lower limiting portion 78 and the second upper limiting portion 79. The employment of the above structure can facilitate forming the second guiding slot 77.

The second upper limiting portion 79 and the second lower limiting portion 78 can use at least two first guiding blocks that are arranged to be spaced apart, which can reduce the consumption of materials and lower the cost.

The first guiding portion 64 is located on one side of the first supporting member 60, and the second guiding portion 65 is located on the other side of the first supporting member 60.

The second supporting member 70 comprises a supporting seat body 80, the second abutting portion 71 is arranged on the supporting seat body 80, and the holder body 10 is mounted on the supporting seat body 80 through a universal joint 83, so that the angle of the holder body 10 can be adjusted through the universal joint 83.

A clamping slot 84 is arranged on the second supporting member 70, and the clamping slot 84 has a slot wall for abutting against the interior of the vehicle, so as to be clamped on a supporting part of the vehicle through the clamping slot 84, which can improve the stability of fixation. The clamping slot 84 is formed on the supporting seat body 80.

Specifically, a first side plate 81 is arranged at one end of the supporting seat body 80, and a second side plate 82 is arranged at the other end; the first upper limiting portion 76 and the first lower limiting portion 75 are arranged on one side of the first side plate 81, which side faces the second side plate 82, while the second upper limiting portion 79 and the second lower limiting portion 78 are arranged on one side of the second side plate 82, which side faces the first side plate 81, which facilitates production.

The third elastic elements 91 are all third springs.

Of course, in addition to the above, the third elastic elements 91 can also use elastic elements such as elastic strips, as long as they can provide corresponding elastic forces.

The above manners of implementation are only preferred ones of the present disclosure, and cannot be used to limit the scope of protection of the present disclosure. Any non-substantial changes and substitutions made by persons skilled in the art on the basis of the present disclosure fall within the scope of protection of the present disclosure.

The invention claimed is:

1. A vehicle-mounted fragrance holder, comprising a connecting device, a holder body, a movable piece, a first elastic element, a first articulated piece, a second elastic element, and a second articulated piece, wherein the connecting device is used for fixation in a vehicle, and the holder body is arranged on the connecting device; the holder body is used for accommodating fragrances and provided with a louver; one end of the second articulated piece is formed as a first abutting end, and the other end is formed as a second abutting end; the second articulated piece is articulated in the holder body, and the first abutting end of the second articulated piece is used for abutting against the louver to push the louver open when the second articulated piece rotates forward; the first articulated piece is articulated within the holder body and located between the movable piece and the second abutting end of the second articulated piece; the movable piece is movably mounted on the holder body, and the first elastic element is positioned between the movable piece and the holder body, pressed against both, and used for providing an elastic force that drives the movable piece to move towards the outside of the holder body; the movable piece is used for pushing the first articulated piece when moving towards the interior of the holder body, so as to propel the second articulated piece to rotate forward through the first articulated piece; the second elastic element is arranged between the holder body and the louver and used for providing an elastic force that drives the louver to close.

2. The vehicle-mounted fragrance holder according to claim 1, wherein the connecting device comprises a first supporting member, a second supporting member, and a third elastic element; the first supporting member comprises a first abutting portion, the second supporting member comprises a second abutting portion, and the first abutting portion and the second abutting portion are used for abutting against the interior of the vehicle, respectively; the first supporting member and the second supporting member are in sliding fit, and the third elastic element is positioned between the first supporting member and the second supporting member, pressed against both, and used for providing an elastic force that drives the first abutting portion and the second abutting portion to move away from each other; the holder body is mounted on the second supporting member.

3. The vehicle-mounted fragrance holder according to claim 2, wherein the second supporting member comprises a supporting seat body, the second abutting portion is arranged on the supporting seat body, and the holder body is mounted on the supporting seat body through a universal joint.

4. The vehicle-mounted fragrance holder according to claim 3, wherein the third elastic element is a third spring.

5. The vehicle-mounted fragrance holder according to claim 2, wherein the third elastic element is a third spring.

6. The vehicle-mounted fragrance holder according to claim 1, wherein the first elastic element is a first spring that is positioned between the movable piece and the holder body and pressed against both, and the second elastic element is a second spring that is connected between the holder body and the louver.

7. The vehicle-mounted fragrance holder according to claim 6, wherein the louver comprises a plurality of slats, which are rotatably mounted on the holder body, respectively; the louver further comprises a connecting rod, and said plurality of slats are articulated on the connecting rod, respectively.

8. The vehicle-mounted fragrance holder according to claim 1, wherein the louver comprises a plurality of slats, which are rotatably mounted on the holder body, respectively; the louver further comprises a connecting rod, and said plurality of slats are articulated on the connecting rod, respectively.

9. The vehicle-mounted fragrance holder according to claim 8, wherein convex columns that correspond to said plurality of slats one by one are arranged on the connecting rod, a connecting wing is arranged on each slat, and a mounting hole is arranged on the connecting wing; the mounting hole of the connecting wing of the slat is configured for insertion of a corresponding convex column.

10. The vehicle-mounted fragrance holder according to claim 9, wherein convex columns that correspond to said plurality of slats one by one are arranged on the connecting rod, a connecting wing is arranged on each slat, and a mounting hole is arranged on the connecting wing; the mounting hole of the connecting wing of the slat is configured for insertion of a corresponding convex column.

11. The vehicle-mounted fragrance holder according to claim 10, wherein the first abutting end of the second articulated piece is used for abutting against one of the slats of the louver; the second elastic element is arranged between the holder body and the connecting rod of the louver.

12. The vehicle-mounted fragrance holder according to claim 11, wherein the first abutting end of the second articulated piece is used for abutting against one of the slats of the louver; the second elastic element is arranged between the holder body and the connecting rod of the louver.

13. The vehicle-mounted fragrance holder according to claim 1, wherein a fitting portion is arranged on the movable piece, and the holder body is provided with a locking portion; when the movable piece is pressed to move towards the interior of the holder body to a position where the fitting portion corresponds to the locking portion, the locking portion is used for locking the fitting portion, so that the movable piece pushes the second articulated piece through the first articulated piece to keep the louver open; when the locking portion locks the fitting portion, the fitting portion can be unlocked from the locking portion by pressing the movable piece towards the interior of the holder body, so that when a pressing force on the movable piece is removed, the movable piece moves towards the outside of the holder body under the action of the first elastic element, and the louver returns to a closed state under the action of the elastic force of the second elastic element.

14. The vehicle-mounted fragrance holder according to claim 1, wherein the holder body comprises a magnetic component, on which a through-hole is arranged; the movable piece is inserted into the through-hole; distal from the first articulated piece, an end of the through-hole is formed as an outlet end; the outlet end is used for allowing an end of the movable piece to extend through, which end is distal from the first articulated piece; the holder body further comprises a main holder, on which the magnetic component is arranged on; the main holder is used for accommodating fragrances and provided with the louver; the first articulated piece and the second articulated piece are articulated within the main holder, respectively.

* * * * *